(12) United States Patent
Ooki et al.

(10) Patent No.: US 10,989,875 B2
(45) Date of Patent: Apr. 27, 2021

(54) THEFT TRACKING SYSTEM AND THEFT TRACKING METHOD FOR OPTICAL FIBER FUSION SPLICING DEVICE

(71) Applicant: SEI OPTIFRONTIER CO., LTD., Yokohama (JP)

(72) Inventors: Kazuyoshi Ooki, Yokohama (JP); Takahiro Suzuki, Yokohama (JP)

(73) Assignee: SEI OPTIFRONTIER CO., LTD., Yokohama (JP)

( * ) Notice: Subject to any disclaimer, the term of this patent is extended or adjusted under 35 U.S.C. 154(b) by 0 days.

(21) Appl. No.: 16/647,114

(22) PCT Filed: Sep. 4, 2018

(86) PCT No.: PCT/JP2018/032753
§ 371 (c)(1),
(2) Date: Mar. 13, 2020

(87) PCT Pub. No.: WO2019/058958
PCT Pub. Date: Mar. 28, 2019

(65) Prior Publication Data
US 2020/0278497 A1 Sep. 3, 2020

(30) Foreign Application Priority Data
Sep. 19, 2017 (JP) .............................. JP2017-178696

(51) Int. Cl.
*G02B 6/255* (2006.01)
*G02B 6/36* (2006.01)

(52) U.S. Cl.
CPC ......... *G02B 6/2551* (2013.01); *G02B 6/2553* (2013.01); *G02B 6/2555* (2013.01); *G02B 6/2558* (2013.01); *G02B 6/3616* (2013.01)

(58) Field of Classification Search
CPC .. G02B 6/2551; G02B 6/2553; G02B 6/2555; G02B 6/2558; G02B 6/3616; G02B 6/255; G08B 13/181; G08B 25/10; G08B 21/24
See application file for complete search history.

(56) References Cited

U.S. PATENT DOCUMENTS

| 10,825,309 B2 * | 11/2020 | Ooki ................... G08B 21/0247 |
| 2005/0238298 A1 * | 10/2005 | Roark .................. G02B 6/2553 385/96 |

(Continued)

FOREIGN PATENT DOCUMENTS

| CN | 101101695 A | 1/2008 |
| CN | 103581825 A | 2/2014 |

(Continued)

OTHER PUBLICATIONS

Oct. 2, 2018 International Search Report issued in International Patent Application No. PCT/JP2018/032753.

(Continued)

*Primary Examiner* — John Bedtelyon
(74) *Attorney, Agent, or Firm* — Oliff PLC (57) ABSTRACT

A theft tracking system for tracking a stolen fusion splicer of fusion splicers each of which is wirelessly accessible. The system includes a registration reception unit to receive registration of identification information of the stolen fusion splicer, a communication unit to transmit an identifier of a wireless access point allocated to the stolen fusion splicer to information communication terminals as a stolen article identifier, an acquisition unit to acquire identifiers of wireless access points around the respective terminals in a predetermined cycle, a determining unit to determine whether there is any identifier matching the stolen article identifier in the identifiers of the acquired wireless access points and to transmit positional information of the infor- (Continued)

mation communication terminal together with the stolen article identifier when determined that there is an identifier matching the stolen article identifier, and a notification unit to issue a notification of the transmitted positional information.

10 Claims, 7 Drawing Sheets

(56) References Cited

U.S. PATENT DOCUMENTS

| | | |
|---|---|---|
| 2013/0284377 A1 | 10/2013 | Takayanagi et al. |
| 2015/0022350 A1 | 1/2015 | Hsu |
| 2016/0353279 A1 | 12/2016 | Sugaya |
| 2020/0134997 A1* | 4/2020 | Ooki .................. G08B 13/22 |

FOREIGN PATENT DOCUMENTS

| | | |
|---|---|---|
| JP | 2006-058474 A | 3/2006 |
| JP | 2012-141357 A | 7/2012 |
| JP | 2016-097824 A | 5/2016 |
| JP | 2016-220166 A | 12/2016 |
| JP | 2017-120585 A | 7/2017 |

OTHER PUBLICATIONS

Mar. 24, 2020 International Preliminary Report on Patentability issued in International Patent Application No. PCT/JP2018/032753.

* cited by examiner

THEFT TRACKING SYSTEM AND THEFT TRACKING METHOD FOR OPTICAL FIBER FUSION SPLICING DEVICE

TECHNICAL FIELD

The present disclosure relates to a theft tracking system and a theft tracking method for an optical fiber fusion splicer. The present application claims priority based on Japanese Patent Application No. 2017-178696, filed on Sep. 19, 2017, the entire contents disclosed in the application are incorporated herein by reference.

BACKGROUND ART

Patent Literature 1 discloses a fusion splicer which splices optical fibers to each other.

CITATION LIST

Patent Literature

Patent Literature 1: Japanese Unexamined Patent Publication No. JP2012-141357
Patent Literature 2: Japanese Unexamined Patent Publication No. JP2016-097824

SUMMARY OF INVENTION

The present disclosure provides a theft tracking system for an optical fiber fusion splicer. The theft tracking system is a theft tracking system for tracking at least one stolen fusion splicer of a plurality of fusion splicers each of which is wirelessly accessible. The theft tracking system includes a registration reception unit to receive registration of identification information of the stolen fusion splicer, a communication unit to transmit an identifier of a wireless access point allocated to the stolen fusion splicer in advance to a plurality of information communication terminals as a stolen article identifier based on the identification information received by the registration reception unit, an acquisition unit to acquire identifiers of wireless access points around the respective information communication terminals in a predetermined cycle for each of the plurality of information communication terminals, a determining unit to determine whether or not there is any identifier matching the stolen article identifier in the identifiers of the wireless access points acquired by the acquisition unit, and to transmit positional information of the information communication terminal together with the stolen article identifier when it is determined that there is an identifier matching the stolen article identifier, and a notification unit to issue a notification of the transmitted positional information as the positional information of the stolen fusion splicer.

The present disclosure provides a theft tracking method for an optical fiber fusion splicer. The theft tracking method tracks at least one stolen fusion splicer of a plurality of fusion splicers each of which is wirelessly accessible using a system including a management server and a plurality of information communication terminals. This theft tracking method includes receiving registration of identification information of the stolen fusion splicer through the management server, transmitting an identifier of a wireless access point allocated to the stolen fusion splicer in advance to the plurality of information communication terminals as a stolen article identifier by the management server based on the identification information received through the management server, acquiring identifiers of wireless access points around the respective information communication terminals in a predetermined cycle for each of the plurality of information communication terminals, determining whether or not there is any identifier matching the stolen article identifier transmitted from the management server in the identifiers of the wireless access points acquired for each of the plurality of information communication terminals, transmitting positional information of the information communication terminal to the management server together with the stolen article identifier by the information communication terminal performing determining when it is determined that there is an identifier matching the stolen article identifier, and issuing a notification of positional information transmitted from the information communication terminal as the positional information of the stolen fusion splicer.

DESCRIPTION OF EMBODIMENT

Problem to be Solved by Present Disclosure

For example, fusion splicers are used at sites where optical fibers are being laid. At a laying site, a user (worker) of a fusion splicer also performs work other than fusion work of optical fibers, and therefore the user may be absent from the fusion splicer. At this time, the fusion splicer may be stolen. In preparation for such theft, it is conceivable that a security function such as a password-based lock mechanism be provided in a fusion splicer. However, it is difficult to inhibit theft itself of the fusion splicer. In addition, there is also a possibility that the fusion splicer will be resold if the password can be deciphered. Thus, further improvement is required from the viewpoint of inhibiting theft.

Effects of Present Disclosure

According to the present disclosure, a stolen fusion splicer can be tracked and found efficiently.

DESCRIPTION OF EMBODIMENT OF PRESENT DISCLOSURE

First, an embodiment of the present disclosure will be enumerated and described. A theft tracking system for a fusion splicer according to the present disclosure is a theft tracking system for tracking at least one stolen fusion splicer of a plurality of fusion splicers each of which is wirelessly accessible. This theft tracking system includes a registration reception unit to receive registration of identification information of the stolen fusion splicer, a communication unit to transmit an identifier of a wireless access point allocated to the stolen fusion splicer in advance to a plurality of information communication terminals as a stolen article identifier based on the identification information received by the registration reception unit, an acquisition unit to acquire identifiers of wireless access points around the respective information communication terminals in a predetermined cycle for each of the plurality of information communication terminals, a determining unit to determine whether or not there is any identifier matching the stolen article identifier in the identifiers of the wireless access points acquired by the acquisition unit and to transmit positional information of the information communication terminal together with the stolen article identifier when it is determined that there is an identifier matching the stolen article identifier, and a notification unit to issue a notification of the transmitted positional information as the positional information of the stolen fusion splicer.

A theft tracking method for a fusion splicer according to the present disclosure is a theft tracking method for tracking at least one stolen fusion splicer of a plurality of fusion splicers each of which is wirelessly accessible using a system including a management server and a plurality of information communication terminals. This theft tracking method includes receiving registration of identification information of the stolen fusion splicer through the management server, transmitting an identifier of a wireless access point allocated to the stolen fusion splicer in advance to the plurality of information communication terminals as a stolen article identifier by the management server based on the identification information received through the management server, acquiring identifiers of wireless access points around the respective information communication terminals in a predetermined cycle for each of the plurality of information communication terminals, determining whether or not there is any identifier matching the stolen article identifier transmitted from the management server in the identifiers of the wireless access points acquired for each of the plurality of information communication terminals, transmitting positional information of the information communication terminal to the management server together with the stolen article identifier by the information communication terminal performing determining when it is determined that there is an identifier matching the stolen article identifier, and issuing a notification of positional information transmitted from the information communication terminal as the positional information of the stolen fusion splicer.

In the theft tracking system and the theft tracking method for an optical fiber fusion splicer, each of the fusion splicers is wirelessly accessible. As a reason for this, in recent years, information communication terminals such as smartphones have begun to be used for updating operation software of fusion splicers, managing the progress of construction work, or the like, and therefore installing a wireless communication function in a fusion splicer for mutual wireless access is considered or performed. Here, utilizing this wireless communication function, the theft tracking system and the theft tracking method for a fusion splicer determine whether or not the identifier (stolen article identifier) of the wireless access point which has been allocated to the stolen fusion splicer in advance matches an identifier of a wireless access point around the terminal acquired by each of the information communication terminals, and issue a notification of the positional information of the information communication terminal as the positional information (approximate positional information) of the stolen fusion splicer when matching is determined. At a work site or the like, it is difficult to distinguish whether or not a fusion splicer is a stolen fusion splicer at a glance from the appearance of the device. However, the theft tracking system and the theft tracking method for a fusion splicer can efficiently track and find a stolen fusion splicer by using information such as an identifier (stolen article identifier) indicating that it has been stolen, as described above. Particularly, when an information communication terminal constituting the theft tracking system described above is used at a work site or the like, finding of a stolen fusion splicer can be realized more efficiently.

In the theft tracking system and the theft tracking method for an optical fiber fusion splicer, the communication unit may transmit either data in which information of the stolen article identifier is compiled or update information of the stolen article identifier to the plurality of information communication terminals. Every time a stolen article identifier of a fusion splicer registered as a stolen article is registered, it may be transmitted to each of the information communication terminals. However, there are cases where there are many stolen article identifiers to be transmitted, and there are cases where the fusion splicer is found so that registration as a stolen article is no longer necessary as well. Thus, the theft tracking system and the theft tracking method realize more efficient processing by transmitting the data in which information of the stolen article identifier is compiled or update information of the stolen article identifier to each of the information communication terminals.

In the theft tracking system and the theft tracking method for an optical fiber fusion splicer, each of the plurality of information communication terminals may include an update processing unit to transmit update information of operation software of the respective fusion splicers to each of the fusion splicers. In this case, the theft tracking system and the theft tracking method can perform update processing of the operation software of the fusion splicers via the information communication terminals. Each of the plurality of information communication terminals may include a theft detection unit to detect theft of the fusion splicer. In this case, for example, the theft tracking system and the theft tracking method detect theft by detecting suspicious movement of the fusion splicer from change or the like in a radio wave intensity of wireless communication of the fusion splicer and can prevent theft itself of the fusion splicer.

In the theft tracking system and the theft tracking method for an optical fiber fusion splicer, the acquisition unit may acquire the identifiers of the wireless access points around the information communication terminals in a cycle of one or more hours or in a cycle of once a day. When a stolen fusion splicer is used at a work site or the like, it is unlikely to move frequently during the day. Thus, even if the identifiers of the wireless access points are not acquired very frequently, the theft tracking system and the theft tracking method can find a stolen fusion splicer. The theft tracking system and the theft tracking method reduce a processing load on the information communication terminal by reducing the frequency of acquisition.

In the theft tracking system and the theft tracking method for an optical fiber fusion splicer, the acquisition unit may be triggered to acquire the identifiers of the wireless access points around the information communication terminals upon reception of the stolen article identifier.

In the theft tracking system and the theft tracking method for an optical fiber fusion splicer, the determining unit may be provided in each of the plurality of information communication terminals. A radio wave range of a wireless module installed in the fusion splicer may be a radius of 20 m or smaller.

DETAILS OF EMBODIMENT OF PRESENT DISCLOSURE

The theft tracking system and the theft tracking method for an optical fiber fusion splicer according to the embodiment of the present disclosure will be described below with reference to the drawings. The present invention is not limited to the examples. The present invention is indicated by the claims, and it is intended to include all changes within meanings and a range equivalent to the claims. In the following description, the same reference signs are applied to the same elements in description of the drawings, and duplicate description will be omitted.

Figure 1:
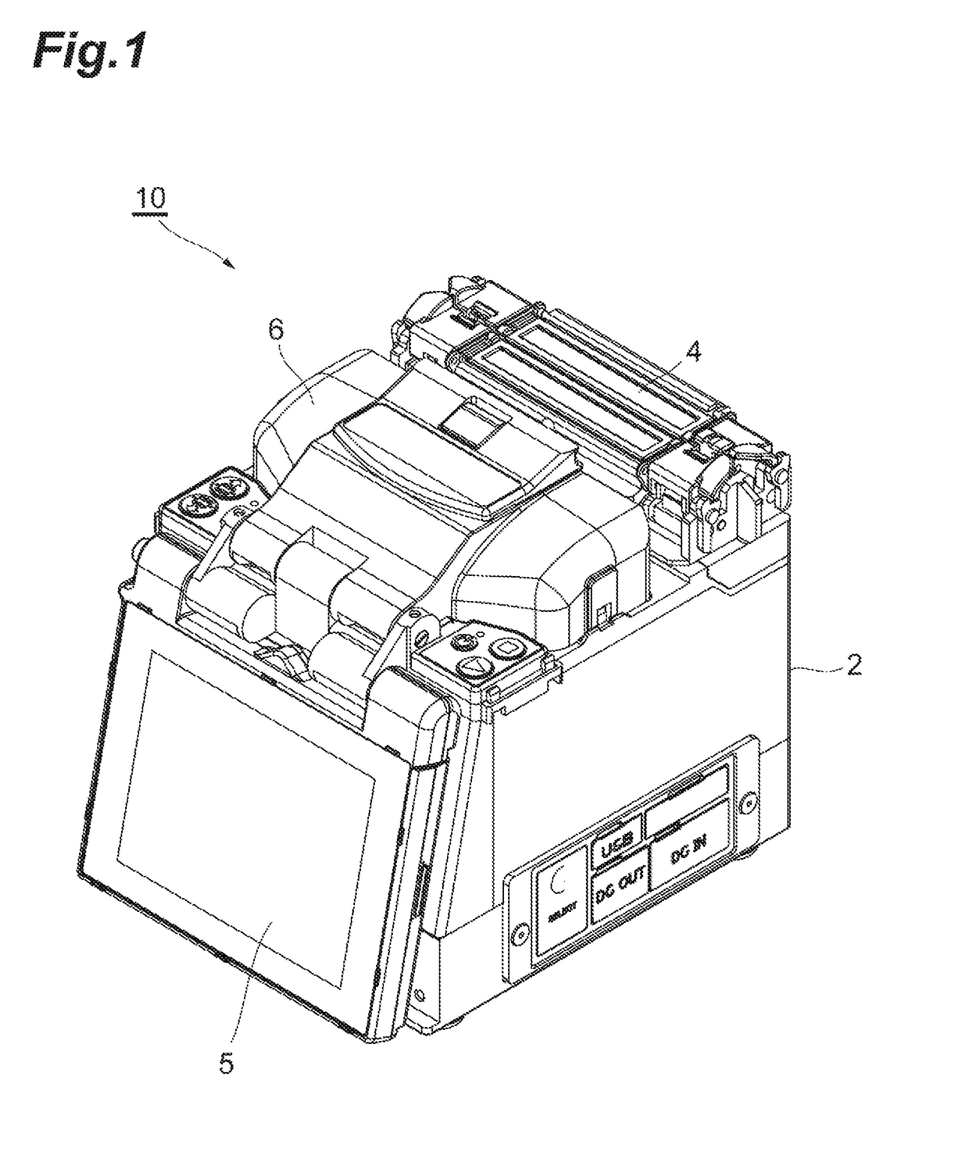
FIG. 1 is a perspective view illustrating an example of an optical fiber fusion splicer.
Figure 2:
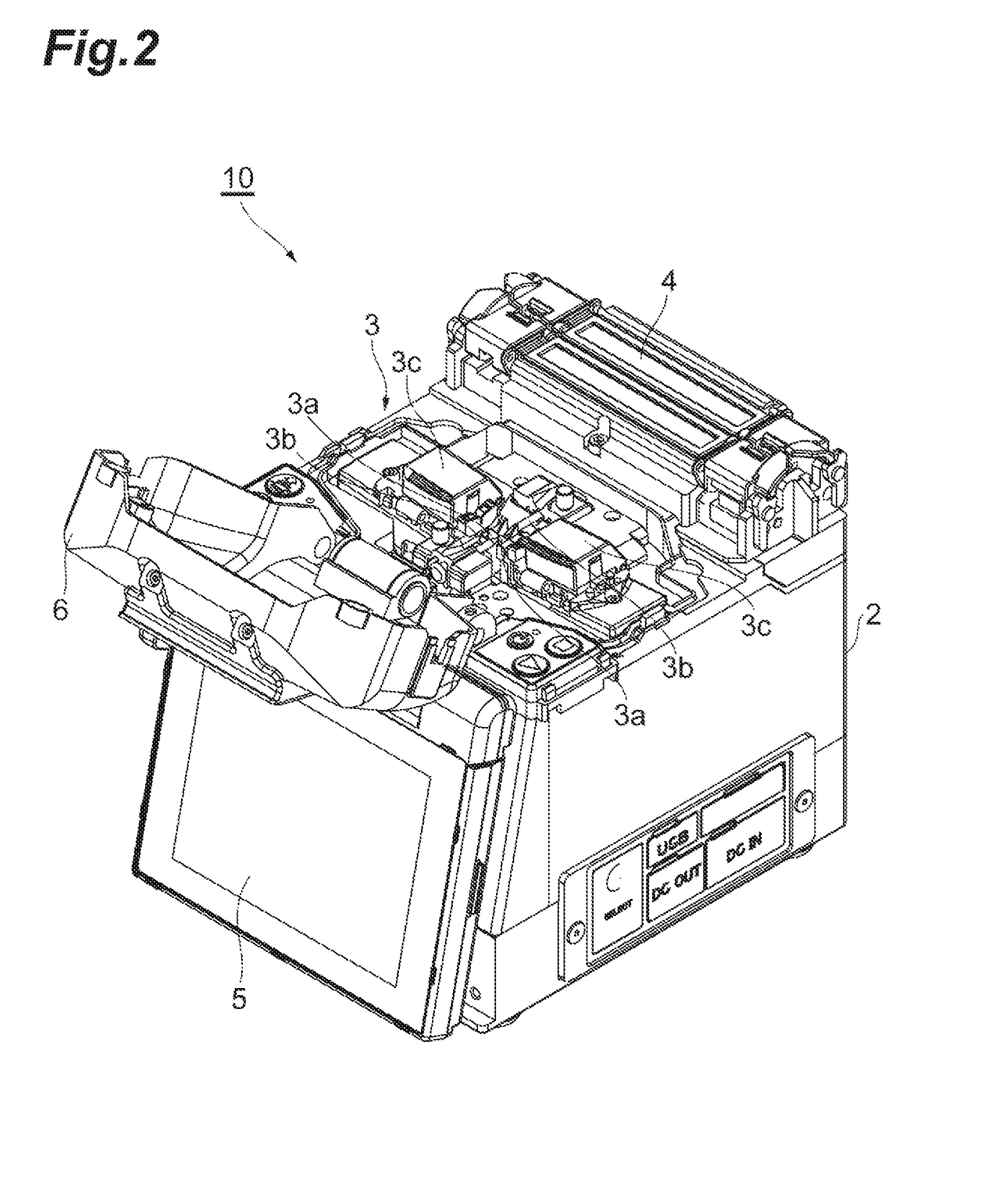
FIG. 2 is a perspective view illustrating an optical fiber fusion splicing mechanism in the fusion splicer illustrated in FIG. 1.

A fusion splicer 10 which becomes a target of theft tracking by the theft tracking system according to the present embodiment will be described with reference to FIGS. 1 and 2. FIGS. 1 and 2 are perspective views illustrating the external appearance of the fusion splicer. FIG. 1 illustrates the external appearance of the fusion splicer in a state where a windshield cover is closed, and FIG. 2 illustrates the external appearance in a state where the windshield cover is open such that an internal structure of the fusion splicer can be seen. The fusion splicer 10 is a device for performing fusion splicing of optical fibers to each other and includes a box-shaped housing 2, as illustrated in FIGS. 1 and 2. In an upper portion of the housing 2, a fusion mechanism 3 for performing fusion between optical fibers, and a heater 4 for heating and contracting a fiber reinforcing sleeve covered with a fusion splicing portion of optical fibers fused by the fusion mechanism 3 are provided. The fusion splicer 10 includes a monitor 5 displaying an image of fusion splicing conditions between optical fibers captured by a camera (not illustrated) disposed inside the housing 2. Moreover, the fusion splicer 10 includes a windshield cover 6 for preventing wind from entering the fusion mechanism 3.

As illustrated in FIG. 2, the fusion mechanism 3 has a pair of fiber positioning units 3a, a pair of discharging electrodes 3b, and a holder mounting unit in which a pair of optical fiber holders 3c can be mounted. Optical fibers (fusion targets) are respectively held and fixed by the optical fiber holders 3c, and each of the optical fiber holders is mounted and fixed in the holder mounting unit. The fiber positioning units 3a are disposed between the optical fiber holders 3c for positioning of tip portions of optical fibers which are respectively held by the optical fiber holders 3c. The discharging electrodes 3b are disposed between the fiber positioning units 3a and perform fusion between tips of optical fibers through arc discharging. In the fusion splicer 10, fiber positioning processing by the fiber positioning units 3a, various conditions for arc discharging by the discharging electrodes 3b, and the like are controlled using the operation software stored in a memory or the like of the fusion splicer 10.

A wireless module (or a wireless incorporated card) for updating such operation software through wireless access is installed in the fusion splicer 10. The communication unit of the fusion splicer 10 is constituted to include a wireless LAN card, for example, and performs wireless communication with an information communication terminal 30 (which will be described below) at a band of 2.4 GHz conforming to IEEE 802.11. An SSID (identifier) of the wireless access point (wireless AP) unique to each of the fusion splicers 10 is wirelessly transmitted within a range of a radius of 10 m approximately, for example. As an example of the SSID, for example, the SSID of the wireless AP of a first fusion splicer 10 is "T71C_4200000001", the SSID of the wireless AP of a second fusion splicer 10 is "T71C_420000002", the SSID of the wireless AP of a third fusion splicer 10 is "T71C_420000003", and the SSID of the wireless AP of a fourth fusion splicer 10 is "T71C_420000004", the fusion splicers 10 have identifiers different from each other. Wireless communication of the fusion splicer 10 is not limited to the communication standard described above and may be performed based on other communication standards.

Figure 3:
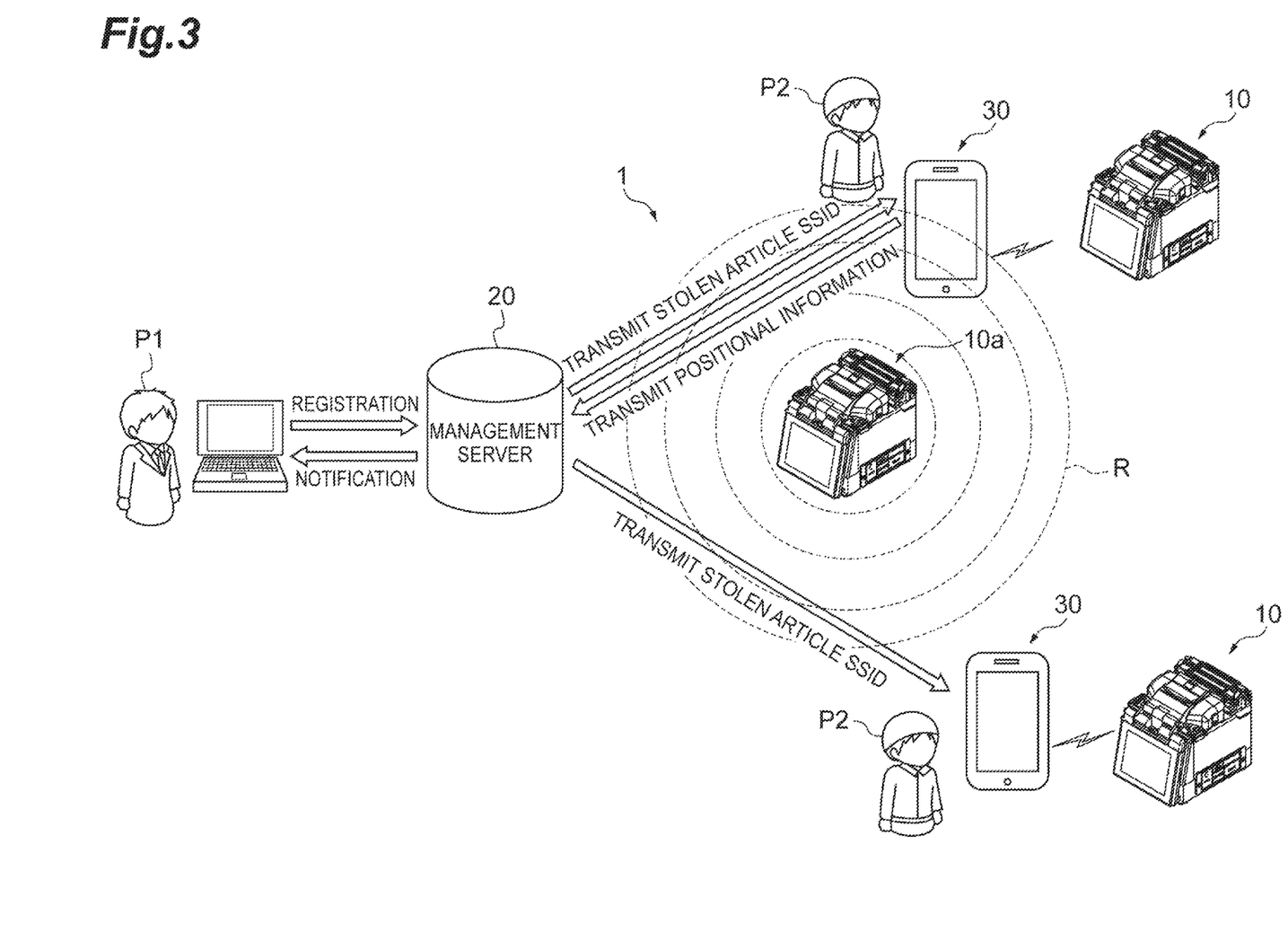
FIG. 3 is a view illustrating an overview of an example of a theft tracking system for an optical fiber fusion splicer.

An overview of a theft tracking system 1 for tracking a stolen fusion splicer (which will hereinafter be referred to as "a stolen article") when the fusion splicer 10 having such a wireless communication function is stolen, will be described with reference to FIG. 3. FIG. 3 is a view illustrating an overview of an example of the theft tracking system for an optical fiber fusion splicer. For example, a fusion splicer 10a illustrated in FIG. 3 indicates a stolen fusion splicer. The theft tracking system 1 includes a management server 20 and a plurality of information communication terminals 30 (e.g. smartphones). The theft tracking system 1 is constituted such that an owner or the manager P1 of the stolen fusion splicer 10a inputs identification information of the fusion splicer 10a (management number or the like) via a computer and the identification information can be registered in the management server 20. The management server 20 transmits the SSID (identifier) of the wireless access point installed in the registered fusion splicer 10a to the plurality of information communication terminals 30 as a stolen article SSID (stolen article identifier). When the fourth fusion splicer described above is registered as a stolen article, the stolen article SSID becomes "T71C_420000004", for example. The information communication terminal 30 is constituted to be able to perform wireless communication with the corresponding fusion splicer 10 at a band of 2.4 GHz conforming to IEEE 802.11, for example, and is used for update processing of the operation software of the fusion splicer 10, managing the progress of construction work, or the like by a worker P2, for example. The information communication terminal 30 may be a general information communication terminal.

In the theft tracking system 1, each of the information communication terminals 30 which has received the stolen article SSID acquires the SSID around the terminal, and determines whether or not the acquired SSID matches the stolen article SSID. The information communication terminal 30 which has acquired the SSID matching the stolen article SSID transmits the positional information of the information communication terminal 30 and the stolen article SSID (determining target) associated with each other to the management server 20 through a telecommunication line (partially including wireless communication) established between the information communication terminal 30 and the management server 20. In the wireless module installed in the fusion splicer 10a, a radio wave range R thereof is a radius of 10 m approximately. Thus, the positional information of the information communication terminal 30 which has found the fusion splicer 10a can be considered as the positional information of the fusion splicer 10a which has been found, for example. The radio wave range R of the wireless module may be 20 m or smaller, for example. The management server 20 which has received the positional information of the terminal notifies the registered owner or the manager P1 of the positional information of the information communication terminal as the positional information of the fusion splicer 10a. As a notification means, a transmission means such as an electronic mail can be used. In such a manner described above, the theft tracking system 1 can track the stolen fusion splicer 10a.

Figure 4:
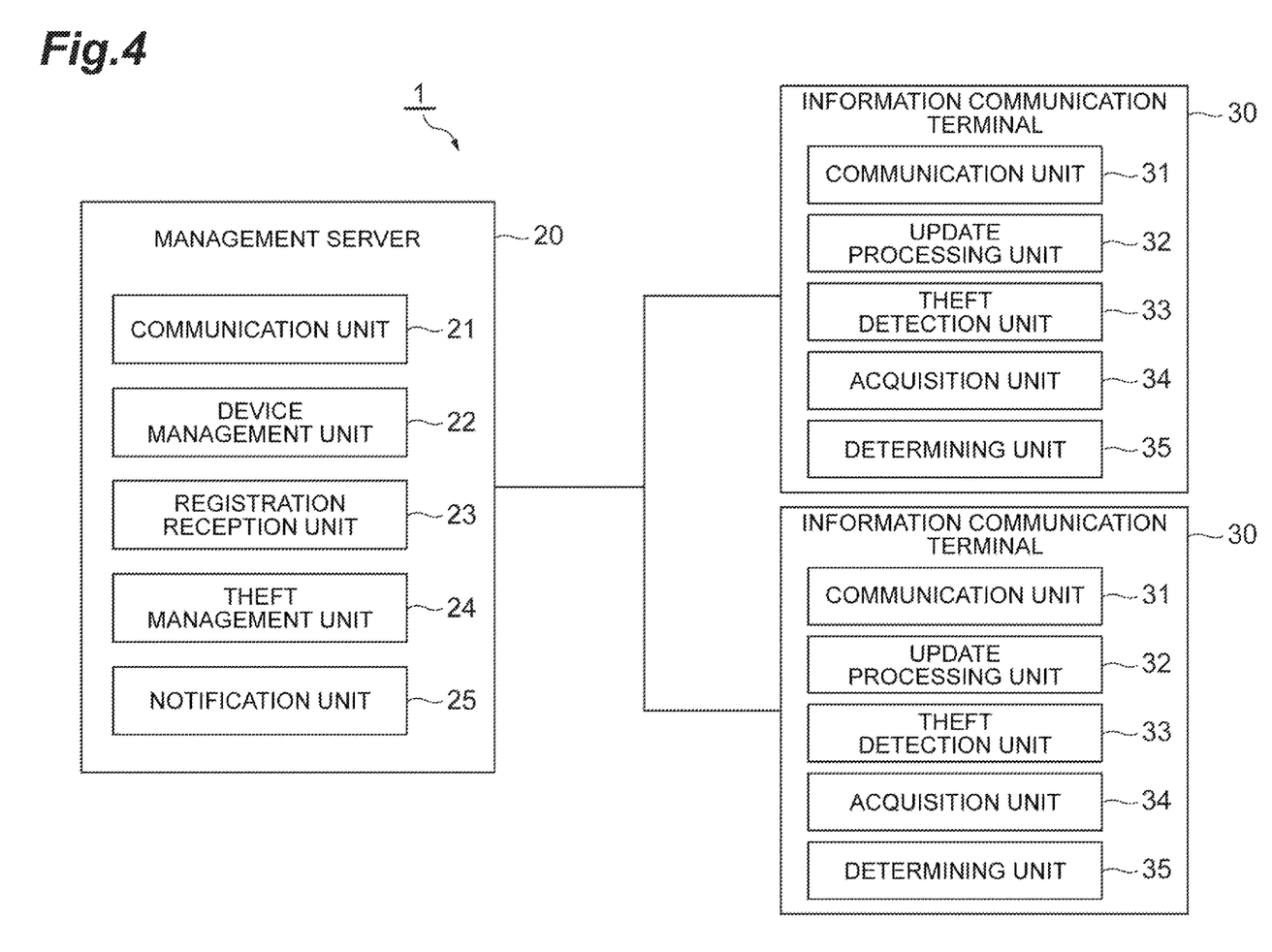
FIG. 4 is a block diagram of a function of the theft tracking system illustrated in FIG. 3.
Figure 5:
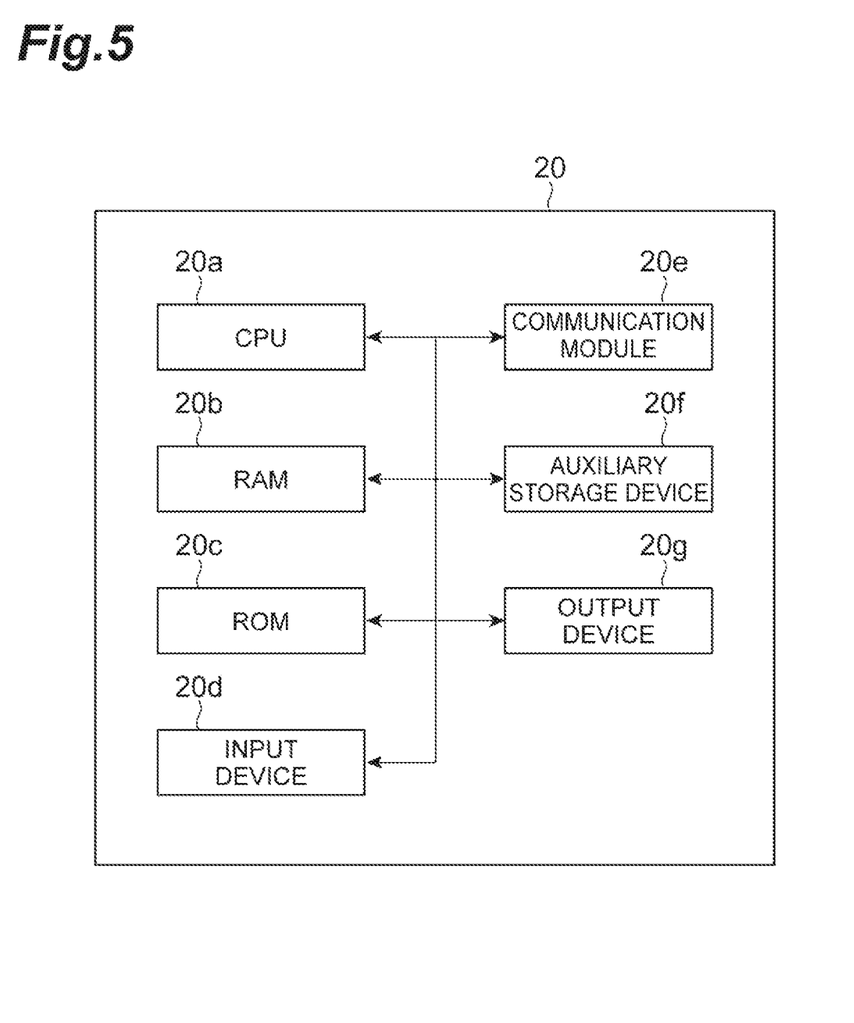
FIG. 5 is a block diagram showing a hardware constitution of a management server shown in FIG. 4.
Figure 6:
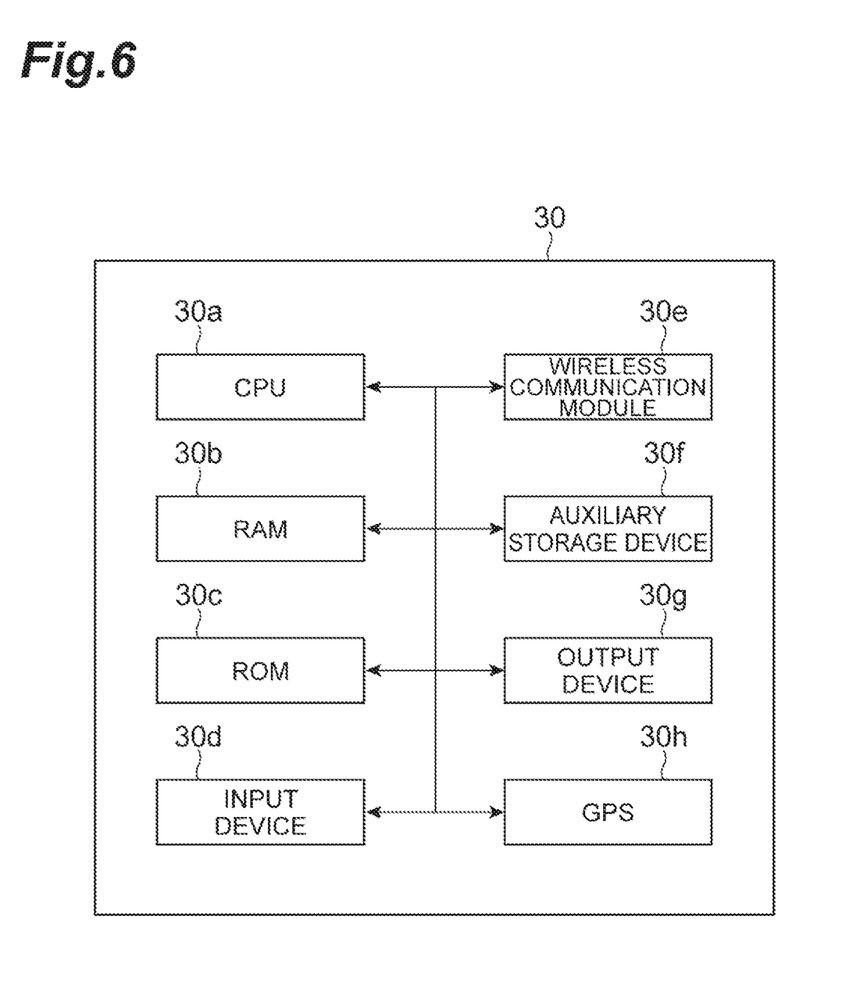
FIG. 6 is a block diagram showing a hardware constitution of an information communication terminal shown in FIG. 4.

With reference to FIGS. 4 to 6, a constitution of the theft tracking system 1 will be described in more detail. FIG. 4 is a block diagram of a function of the theft tracking system 1. FIG. 5 is a block diagram showing a hardware constitution of the management server 20. FIG. 6 is a block diagram showing a hardware constitution of the information communication terminal 30. As illustrated in FIG. 4, the management server 20 functionally includes a communication unit 21, a device management unit 22, a registration reception unit 23, a theft management unit 24, and a notification unit 25. As illustrated in FIG. 5, the management server 20 is physically constituted to include a computer provided with hardware such as a CPU 20a, a RAM 20b, a ROM 20c, an input device 20d such as a keyboard, a communication module 20e transmitting and receiving various kinds of data, an auxiliary storage device 20f such as a semiconductor memory or a hard disk, and an output device 20g such as a display. The management server 20 realizes each of the functions of the management server 20 by operating the hardware based on control of the CPU 20a and reading and writing data in the RAM 20b, the auxiliary storage device 20f, and the like using a program or the like stored in the hardware such as the RAM 20b.

The communication unit 21 transmits and receives information with respect to a communication unit 31 of the information communication terminal 30 via a telecommunication line (partially including wireless communication). The communication unit 21 transmits management of the progress of construction work by the fusion splicer 10 managed by the device management unit 22, the operation software of the fusion splicer 10, or update information thereof, and the stolen article SSID of the fusion splicer 10a generated by the theft management unit 24, to each of the information communication terminals 30. The communication unit 21 receives various kinds of information including progress management information from the information communication terminal 30, and positional information when the stolen fusion splicer 10a is found.

The device management unit 22 manages the progress management information of construction work by the fusion splicer 10 via the information communication terminal 30, information of the operation software of the fusion splicer 10, and the like. Since the fusion splicer 10 is constituted to wirelessly access the information communication terminal 30 in the theft tracking system 1, various kinds of information of the fusion splicer 10 can be acquired through the wireless access via the information communication terminal 30, and the information can be managed and processed.

When the identification information of the stolen fusion splicer 10a is input from the owner or the manager P1 of the fusion splicer 10a, the registration reception unit 23 receives input registration thereof. When the identification information of the stolen fusion splicer 10a is input, the registration reception unit 23 records the identification information in a storage domain of the management server 20.

The theft management unit 24 acquires the SSID of the wireless access point of the stolen fusion splicer 10a from a predetermined database based on the identification information of the stolen fusion splicer 10a of which registration is received by the registration reception unit 23, and the theft management unit 24 associates the identification information and the SSID of the wireless access point thereof with each other and manages it as theft information. The theft management unit 24 transmits the SSID of the wireless access point included in the theft information to the plurality of information communication terminals 30 as the stolen article SSID via the communication unit 21. The theft management unit 24 may transmit the stolen article SSID to the information communication terminal 30 every time the registration reception unit 23 receives registration, or may transmit compiled information of the stolen article SSID compiled in a predetermined cycle to the information communication terminal 30. The theft management unit 24 may transmit the update information of the stolen article SSID, in which theft registration is partially canceled because the stolen article has been found, to the information communication terminal 30.

The notification unit 25 notifies a registrar of the positional information of the information communication terminal transmitted from the information communication terminal 30 which has found the stolen fusion splicer 10a as the positional information of the stolen fusion splicer 10a. When the positional information is received from the information communication terminal 30 via the communication unit 21, the notification unit 25 reads out the identification information from the stolen article SSID associated with the positional information, derives the owner or the manager P1 (target), and issues a notification using a notification means such as an electronic mail. The owner or the manager P1 who has received a notification through an electronic mail can find the stolen fusion splicer 10a from the positional information included in the notification mail.

The information communication terminal 30 consists of an information communication terminal such as a portable wireless terminal (e.g. a smartphone) or a personal computer (PC) having a wireless communication function. The information communication terminal 30 functionally includes the communication unit 31, an update processing unit 32, a theft detection unit 33, an acquisition unit 34, and a determining unit 35. As illustrated in FIG. 6, the information communication terminal 30 is physically constituted to include a computer provided with hardware such as a CPU 30a, a RAM 30b, a ROM 30c, an input device 30d such as a touch panel for receiving an input of a user's operation, a wireless communication module 30e wirelessly transmitting and receiving data, an auxiliary storage device 30f such as a semiconductor memory or a hard disk, an output device 30g such as a display, and a GPS 30h acquiring positional information. The information communication terminal 30 realizes each of the functions of the information communication terminal 30 by operating the hardware based on control of the CPU 30a and reading and writing data in the RAM 30b, the auxiliary storage device 30f, and the like using a program or the like stored in the hardware such as the RAM 30b.

The communication unit 31 is constituted to include the wireless communication module 30e, for example, and receives various kinds of radio signals from the fusion splicer 10 through wireless communication. The communication unit 31 is constituted to include a wireless LAN module built into a terminal and performs communication at a band of 2.4 GHz conforming to IEEE 802.11, for example, such that it corresponds to the wireless standard on the fusion splicer 10. The communication unit 31 receives the SSIDs (identifiers) individually allocated to the respective fusion splicers 10 and 10a from each of the fusion splicers 10 and 10a through radio signals. The communication unit 31 transmits and receives a predetermined signal with respect to the management server 20 through a predetermined telecommunication network (partially including wireless communication).

The update processing unit 32 determines whether or not the operation software of each of the fusion splicers 10 to which the SSIDs (identifiers) received by the communication unit 31 are allocated is an update target. The update processing unit 32 performs update processing of the operation software, as necessary. When the SSID is received from the fusion splicer 10, the update processing unit 32 accesses a database of the management server 20 via a predetermined telecommunication network, acquires a target device list requiring update processing of the operation software, and determines whether or not the received SSID is included in the target device list, that is, whether or not it is the fusion splicer 10 requiring update processing of the operation software. When it is determined to be the fusion splicer 10 requiring update processing of the operation software, the update processing unit 32 wirelessly transmits required information to the fusion splicer 10. When this information is acquired in the fusion splicer 10, required update processing of the operation software is executed.

The theft detection unit 33 detects in advance that the fusion splicer 10 has been stolen at a work site or the like utilizing change in intensity of a radio signal with respect to the fusion splicer 10. The theft detection unit 33 detects a theft state of the fusion splicer 10 in advance utilizing change in intensity of a radio signal with respect to the fusion splicer 10, and notifies a worker of the fact using a buzzer, vibration, or the like. When change in intensity of a radio signal is manifested as a quicker change than usual, or when the intensity of a radio signal becomes weaker than that of a predetermined value (when the fusion splicer 10 has moved farther away), the theft detection unit 33 may detect it as a theft state.

When the SSID of the wireless access point (stolen article SSID) allocated to the fusion splicer 10a in advance is received by the information communication terminal 30, the acquisition unit 34 acquires the SSIDs of the wireless access points around the respective information communication terminals 30 in a predetermined cycle. The acquisition unit 34 delivers the acquired information of the SSIDs of the wireless access points around thereof to the determining unit 35.

The determining unit 35 determines whether or not there is any SSID matching the stolen article SSID transmitted from the management server 20 in the SSIDs of the wireless access points acquired by the acquisition unit 34. When information of the SSIDs of the wireless access points around thereof is received from the acquisition unit 34, the determining unit 35 determines whether or not there is any SSID matching the stolen article SSID transmitted from the management server 20 in these SSIDs of the wireless access points. When it is determined that there is an SSID matching the stolen article SSID, the determining unit 35 transmits the positional information of the information communication terminal 30 together with the stolen article SSID to the management server 20 via the communication unit 31. Accordingly, the management server 20 executes a notification of the positional information of the fusion splicer 10a.

Figure 7:
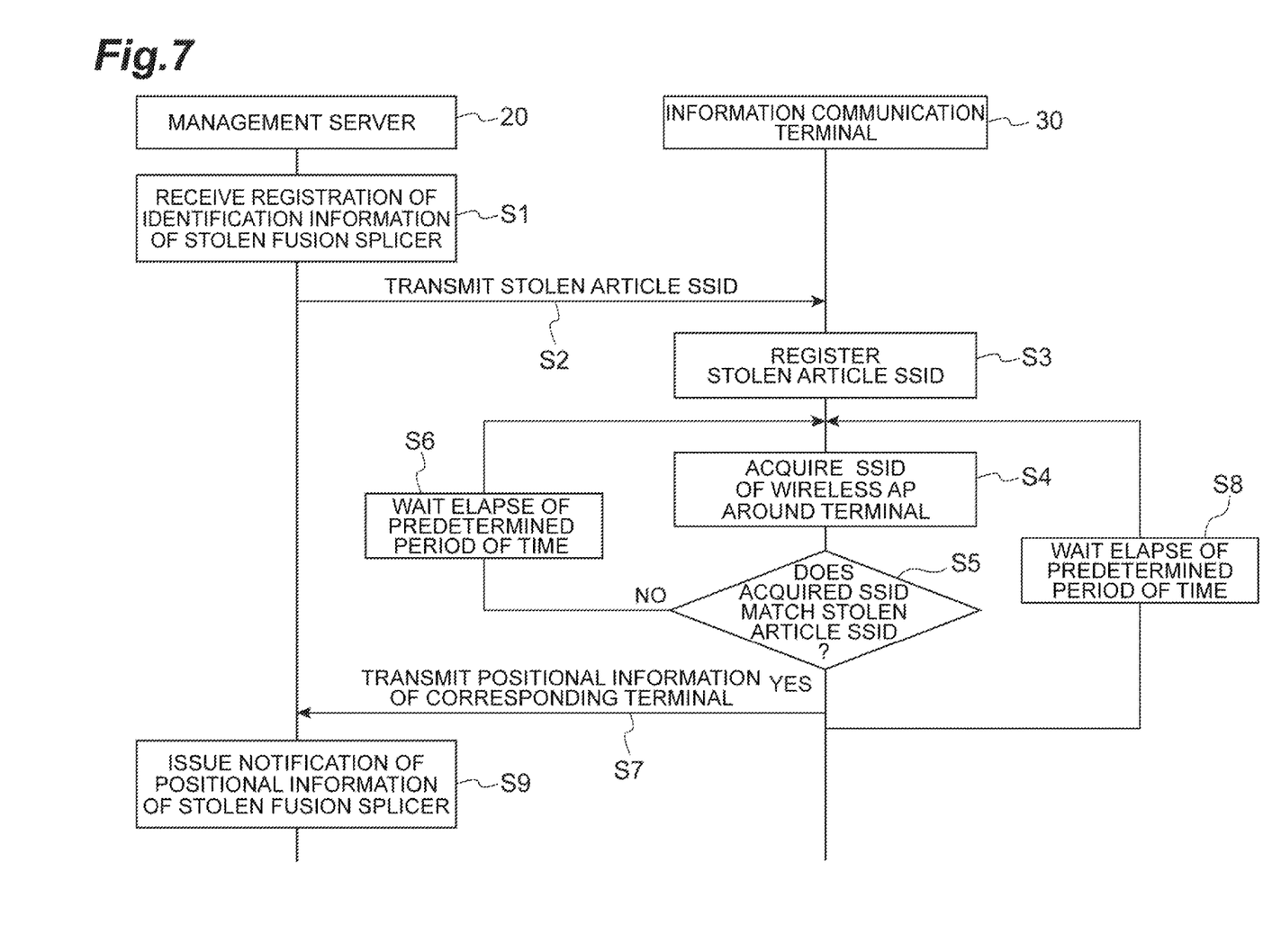
FIG. 7 is a sequence diagram showing a method for tracking a stolen fusion splicer using the theft tracking system illustrated in FIG. 4.

The theft tracking method for a stolen fusion splicer will be described with reference to FIG. 7. FIG. 7 is a sequence diagram showing a method for tracking a stolen fusion splicer using the theft tracking system 1.

When the identification information of the stolen fusion splicer is registered by the owner or the manager P1, the management server 20 of the theft tracking system 1 receives registration of the identification information thereof (Step S1). When registration of the identification information of the stolen fusion splicer is received, the management server 20 reads out the SSID of the wireless access point of the fusion splicer corresponding to the identification information thereof from a management database, and the management server 20 associates the identification information and the SSID of the wireless access point thereof with each other and manages it as theft information. In addition to this, the management server 20 transmits the SSID of the wireless access point thereof to the plurality of information communication terminals 30 as the stolen article SSID (Step S2).

Each of the information communication terminals 30 which has received the stolen article SSID stores and registers the received stolen article SSID in a predetermined storage domain (Step S3) and performs processing of acquiring the SSID of the wireless access point around the terminal (Step S4). Then, the information communication terminal 30 determines whether or not any of the acquired SSIDs around the terminals matches the stolen article SSID (Step S5). In determining in Step S5, when none of the acquired SSIDs matches the stolen article SSID, the information communication terminal 30 waits the elapse of a predetermined period of time (Step S6), acquires the SSID of the wireless access point around the terminal in Step S4, and executes comparison processing again with the stolen article SSID in Step S5. As the elapse of a predetermined period of time, for example, a time of one hour or longer or one day may be adopted. That is, the processing of acquiring and determining described above may be executed in a cycle of one or more hours or in a cycle of once a day.

On the other hand, in determining in Step S5, when any of the acquired SSIDs matches the stolen article SSID, the information communication terminal 30 acquires positional information of a host device through a GPS or the like, and the information communication terminal 30 associates the positional information thereof and the stolen article SSID with each other and transmits it to the management server 20 (Step S7). The information communication terminal 30 which has transmitted the positional information waits the elapse of a predetermined period of time for tracking processing of other stolen article SSIDs (Step S8), acquires the SSID of the wireless access point around the terminal in Step S4, and executes comparison processing again with the stolen article SSID in Step S5.

When the positional information of the information communication terminal is sent from the information communication terminal 30 as the positional information of a stolen article, the management server 20 checks the stolen article SSID, which is associated with the positional information, with the theft information being managed, and specifies the fusion splicer having the identification information which becomes a target or the owner thereof. The management server 20 notifies the owner of the positional information of the stolen fusion splicer using a notification means such as an electronic mail (Step S9). In such a manner described above, the theft tracking method for a stolen fusion splicer ends.

According to the theft tracking system 1 and the theft tracking method for an optical fiber fusion splicer according to the present embodiment, utilizing the wireless communication functions installed in the fusion splicers 10 and 10a, it is determined whether or not the SSID (stolen article SSID) of the wireless access point which has been allocated to the stolen fusion splicer 10a in advance matches the SSID of the wireless access point around the terminal acquired by each of the information communication terminals 30. When matching is determined, the theft tracking system 1 issues a notification of the positional information of the information communication terminal 30 as the positional information (approximate positional information) of the stolen fusion splicer 10a. At a work site or the like, it is difficult to distinguish whether or not a fusion splicer is a stolen fusion splicer at a glance from the appearance of the device. However, the stolen fusion splicer 10a can be tracked and found efficiently by using information such as an identifier (stolen article identifier) indicating that it has been stolen, as described above. Particularly, when the information communication terminal 30 constituting the theft tracking system 1 described above is used at a work site or the like, finding of the stolen fusion splicer 10a can be realized more efficiently.

In the theft tracking system 1 and the theft tracking method for an optical fiber fusion splicer according to the present embodiment, the management server 20 can transmit either data in which information of the stolen article SSID is compiled or update information of the stolen article SSID to each of the information communication terminals 30. Every time a stolen article SSID of a fusion splicer registered as a stolen article is registered, it may be transmitted to each of the information communication terminals 30. However, there are cases where there are many stolen article SSIDs to be transmitted, and there are cases where the fusion splicer is found so that registration as a stolen article is no longer necessary as well. Thus, the theft tracking system 1 can perform more efficient processing by transmitting the data in which information of the stolen article SSID is compiled or the update information of the stolen article SSID to each of the information communication terminals 30.

In the theft tracking system 1 and the theft tracking method for an optical fiber fusion splicer according to the present embodiment, each of the plurality of information communication terminals 30 includes the update processing unit 32 to transmit update information of the operation software of the respective fusion splicers 10 to each of the fusion splicers. Thus, update processing of the operation software of the fusion splicers 10 can be performed via the information communication terminals 30. Each of the plurality of information communication terminals 30 includes the theft detection unit 33 to detect theft of the fusion splicer 10. Thus, for example, theft can be detected by detecting suspicious movement of the fusion splicer from change or the like in a radio wave intensity of wireless communication of the fusion splicer, and theft itself of the fusion splicer 10 can be prevented. Since two functions such as a function of detecting theft and a function of tracking theft are provided, the theft tracking system 1 better inhibits theft of the fusion splicer.

In the theft tracking system 1 and the theft tracking method for an optical fiber fusion splicer according to the present embodiment, the acquisition unit 34 can acquire the SSIDs of the wireless access points around the information communication terminals 30 in a cycle of one or more hours or in a cycle of once a day. When the stolen fusion splicer 10a is used at a work site or the like, it is unlikely to move frequently during the day. Thus, even if the SSIDs of the wireless access points are not acquired very frequently, a stolen article can be found. The theft tracking system 1 can reduce a processing load on the information communication terminal 30 by reducing the frequency of acquisition.

The theft tracking system and the theft tracking method for a fusion splicer according to the present embodiment have been described. However, the theft tracking system and the theft tracking method according to the present invention are not limited to the foregoing embodiment, and various modifications can be applied.

REFERENCE SIGNS LIST

1 Theft tracking system
10, 10a Fusion splicer
20 Management server
21 Communication unit
22 Device management unit
23 Registration reception unit
24 Theft management unit
25 Notification unit
30 Information communication terminal
31 Communication unit
32 Update processing unit
33 Theft detection unit
34 Acquisition unit
35 Determining unit
P1 Owner or manager
P2 Worker

The invention claimed is:

1. A theft tracking system for tracking at least one stolen fusion splicer of a plurality of fusion splicers each of which is wirelessly accessible, the theft tracking system comprising:
   a registration reception unit to receive registration of identification information of the stolen fusion splicer;
   a communication unit to transmit an identifier of a wireless access point allocated to the stolen fusion splicer in advance to a plurality of information communication terminals as a stolen article identifier based on the identification information received by the registration reception unit;
   an acquisition unit to acquire identifiers of wireless access points around the respective information communication terminals in a predetermined cycle for each of the plurality of information communication terminals;
   a determining unit to determine whether or not there is any identifier matching the stolen article identifier in the identifiers of the wireless access points acquired by the acquisition unit, and to transmit positional information of the information communication terminal together with the stolen article identifier when it is determined that there is an identifier matching the stolen article identifier; and
   a notification unit to issue a notification of the transmitted positional information as the positional information of the stolen fusion splicer.

2. The theft tracking system for a fusion splicer according to claim 1, wherein the communication unit transmits either data in which information of the stolen article identifier is compiled or update information of the stolen article identifier to the plurality of information communication terminals.

3. The theft tracking system for a fusion splicer according to claim 1, wherein each of the plurality of information communication terminals includes an update processing unit to transmit update information of operation software of the respective fusion splicers to each of the fusion splicers.

4. The theft tracking system for a fusion splicer according to claim 1, wherein each of the plurality of information communication terminals includes a theft detection unit to detect theft of the fusion splicer.

5. The theft tracking system for a fusion splicer according to claim 1, wherein the acquisition unit acquires the identifiers of the wireless access points around the information communication terminals in a cycle of one or more hours or in a cycle of once a day.

6. The theft tracking system for a fusion splicer according to claim 1, wherein the acquisition unit is triggered to acquire the identifiers of the wireless access points around the information communication terminals upon reception of the stolen article identifier.

7. The theft tracking system for a fusion splicer according to claim 1, wherein the determining unit is provided in each of the plurality of information communication terminals.

8. The theft tracking system for a fusion splicer according to claim 1, wherein a radio wave range of a wireless module installed in the fusion splicer is a radius of 20 m or smaller.

9. A theft tracking method for tracking at least one stolen fusion splicer of a plurality of fusion splicers each of which is wirelessly accessible using a system including a management server and a plurality of information communication terminals, the theft tracking method comprising:
  receiving registration of identification information of the stolen fusion splicer through the management server;
  transmitting an identifier of a wireless access point allocated to the stolen fusion splicer in advance to the plurality of information communication terminals as a stolen article identifier by the management server based on the identification information received through the management server;
  acquiring identifiers of wireless access points around the respective information communication terminals in a predetermined cycle for each of the plurality of information communication terminals;
  determining whether or not there is any identifier matching the stolen article identifier transmitted from the management server in the identifiers of the wireless access points acquired for each of the plurality of information communication terminals;
  transmitting positional information of the information communication terminal to the management server together with the stolen article identifier by the information communication terminal performing determining when it is determined that there is an identifier matching the stolen article identifier; and
  issuing a notification of the positional information transmitted from the information communication terminal as the positional information of the stolen fusion splicer.

10. The theft tracking method for a fusion splicer according to claim 9, wherein the acquiring is triggered to acquire the identifiers of the wireless access points around the respective information communication terminals upon reception of the stolen article identifier.

* * * * *